United States Patent [19]
Hodges et al.

[11] Patent Number: 5,991,794
[45] Date of Patent: Nov. 23, 1999

[54] COMPONENT INTEGRATION SYSTEM FOR AN APPLICATION PROGRAM

[75] Inventors: C. Douglas Hodges; Srinivasa R. Koppolu, both of Redmond; Michael Halcoussis, Woodinville; Clarence A. Glasse, Tacoma, all of Wash.

[73] Assignee: Microsoft Corporation, Redmond, Wash.

[21] Appl. No.: 08/893,164

[22] Filed: Jul. 15, 1997

[51] Int. Cl.[6] .................................................. G06F 9/00
[52] U.S. Cl. .......................................... 709/107; 709/104
[58] Field of Search ..................................... 709/100, 300, 709/302, 102, 104, 107

[56] References Cited

U.S. PATENT DOCUMENTS 5,252,951  10/1993  Tannenbaum et al. .................. 345/156
5,721,850  2/1998   Farry et al. ............................. 345/346

*Primary Examiner*—Majid A. Banankhah
*Attorney, Agent, or Firm*—Jones & Askew, LLP

[57] ABSTRACT

A component integration system including a component manager that controls the main message loop of the application program and allows a multiplicity of components running within a single process to share in main message loop services. If the application program supports multiple threads running within a single process, then the component manager allows a multiplicity of components running within a single thread to share in main message loop services. Specifically, the component manager routes messages from the main message queue to the various components and allows the components to share in the following services: (1) allocation of idle time, (2) pretranslation of accelerator and other messages, (3) notification of program state changes, and (4) pushing the main message loop. The component manager and the cooperating components define standard interfaces for introducing new components into the application program. Thus, these new components may share in the message loop services without having to duplicate the message loop processing code, and without developing parallel execution stacks.

14 Claims, 11 Drawing Sheets

COMPONENT INTEGRATION SYSTEM FOR AN APPLICATION PROGRAM

TECHNICAL FIELD

The present invention relates to computer operating systems and, more particularly, to a component integration system that includes a component manager that controls the main message loop of an application program and allows a multiplicity of components to share in services provided by the main message loop.

BACKGROUND OF THE INVENTION

Many types of application programs are currently available for personal computer systems, such as word processing programs, spread sheet programs, personal calendar programs, multimedia programs, etc. These application programs typically include a number of components that function, in many respects, as independent entities. Each component is typically configured as a separate module or object in an object-oriented operating environment.

Although a component is an independent module, it defines an interface—a standardized communication syntax—for communicating with it. In this manner, virtually all of the functionality of the application program may be implemented through a set of cooperating components. For example, a word processing program may include a separate component for each document that the user has opened, as well as separate components for the tool bar, each item in the tool bar, each pull-down window that can be activated from the tool bar, each individualized user interface that can be activated from the tool bar, etc.

Each component usually, but not necessarily, includes a graphical user interface aspect, which is typically referred to as a window. When a user selects a particular component, the component may become instantiated, which means that the component's window is created and displayed. The user may then interact with the component by sending input messages to the component. For example, a user may open a word processing document and then use the keyboard to enter text into the document. Many components may be simultaneously instantiated, and the set of instantiated components changes dynamically as the user operates the computer system, opening windows, closing windows, selecting functions, and so forth.

Because more than one component may be instantiated at the same time, each component has the capability of becoming active, which is also referred to as receiving the focus. When a component has the focus, it receives general input messages from the user input devices, such as the keyboard and the mouse. The user changes the active component by using a predefined activation command. For example, some components may be activated by navigating the pointer near or over a top level or displayed portion of the desired component, other components may be activated by through a point-and-click command with the pointer on a top level portion of the desired component, and these or other components may be activated through predefined keyboard commands.

The object-oriented operating environment allows components developed by different groups to be integrated into a cooperating whole. This allows program modifications and improvements to be implemented by adding new components that define new functionality to a preexisting application program. The program developers therefore provide tools, such as interfaces, to help integrate newly created components into a preexisting set of cooperating component. It is important, of course, that the various components cooperate properly with each other.

With this in mind, the program developers typically build as much functionality into an application programs as possible, given a particular release date. But desirable new features and options are almost always identified after the release date. And in many case, certain features may only be desirable for a select group of users, whereas other users may prefer a different set of features. For this reason, tools that often referred to as a "software developer's tool-kit" or "SDK" are often provided to allow developers to make post-release modifications to an application program. Much effort goes developing SDKs and making application programs amenable to post-release modifications. In fact, the developers of an original application program may intend that software developers will use an SDK to create new components for the application program that were never anticipated by the original program developers.

Generally stated, there is a need to integrate components, including post-release components developed using an SDK, with the other components of an application program so that all of the components operate properly in conjunction with each other. There are a number of objectives when integrating the component that are not satisfied by prior component integration systems. In particular, there are a number of objectives that are not met for integrating post-release components into a preexisting application programs.

In prior art component integration systems, the operating system coordinates the routing of the focus and input messages to application programs that are running on different threads or processes. Because each thread or process may operate its own message loop, the coordination provided by the operating system allows each of the application programs to receive message loop services. However, the operating system gives no support to providing message loop services to multiple components running within a single thread or process. It would be advantageous, therefore, for the components running within a single thread or process to be able to receive message loop services.

For example, a component may be capable of changing a global state parameter of the application program, such as turning on or off a warning message feature or a background printing feature. It would be advantageous for the application program to take notice of this type of global program state changes so that the state will remain set when the user activates another component. For instance, if the user turns a warning message feature off when a post-release component is active, it would be annoying if the warning message feature remained on when other components are subsequently activated.

Notification of a modal state invoked by a component is another one of the critical pieces that is missing in prior component integration systems. When a component enters a modal state, such as a spin dial or another multi-item selection device, it typically displays a special user interface that requires a response from the user before terminating the modal state. Therefore, it would be advantageous for the windows for the other instantiated components to be disabled so that they cannot be activated until the modal state has been terminated. Prior component integration systems are restricted in their ability to disable peer-level components, which interferes with and limits the flexibility of modal state functions.

More importantly, a component must not operate in a way that conflicts with the operation of the underlying application program. A typical application program has a top level or main message loop that allows the application program to read input messages from a main message queue and dispatch the input messages to the appropriate components in an orderly manner. If a component interrupts the main message loop of the application and initiates its own message loop, a parallel execution stack may be created. This may cause the component to return processing to the main message loop in a manner that causes the application program to become unstable and crash unexpectedly. This, of course, is most undesirable. Other major problems would be caused by this type of private message loop because it probably would not include the proper logic for handling keyboard accelerators. It would also inhibit the allocation of idle time to other components. Therefore, a post-release component, whose operation cannot be known in advance, should not be permitted to operate its own message loop. Instead, a post-release component should be configured to rely on the main message loop processing of the underlying application program.

This restriction complicates the allocation of idle time, which allows an application program to perform idle time tasks, such as background printing, computing, or data transferring. In response to an idle condition, such as the main message queue being empty, the application program allocates idle time to components that have idle time tasks to perform. Prior component integration systems are not able to allocate idle time to post-release component that have idle time tasks to perform. Moreover, idle time may occur when the application program is waiting for a return from a message dispatched to a component. If idle time occurs when a post-release component is executing a function, prior component integration systems are not able to allocate this idle time to other components.

In addition, the application program may be configured to detect specific key combinations that map to predefined command. These specific key combinations, such as Ctrl-S for a save command, are referred to as accelerator messages. When the application program notices an accelerator message, the application program executes a predefined function call, such as a save function call, rather than dispatching the message to a component. It would be advantageous for the application program to be able detect accelerator messages directed to a post-release component. But because post-release components are typically not permitted to run their own message loops, there is no mechanism in place for routing accelerator and other messages to the post-release components. Those skilled in the art will understand that the previous statement refers to general components that are not in an OLE/COM in-place relationship. OLE in-place objects do have a mechanism for routing accelerator and other messages to post-release in-place components. However, prior component integration systems do not generalize this concept to components that are not OLE in-place objects.

Therefore, there is a need for a component integration system that may selectively route accelerator and other messages to a component for translation prior to translation by the host application program. There is a further need for a component integration system that allocates idle time to various components running within a single thread or process, disables components at appropriate times, and notifies components of application program state changes. There is a further need to provide this component integration system with a standard interface so that components supplied by various groups, including post-release components, may be properly integrated into the application program.

SUMMARY OF THE INVENTION

The present invention provides a component integration system including a component manager that controls the main message loop of an application program. The component manager allows a multiplicity of components running within a single process to share in main message loop services. If the application program supports multiple threads running within a single process, then the component manager allows a multiplicity of components running within a single thread to share in main message loop services. Specifically, the component manager routes messages from the main message queue to the various components and allows the components to share in the following services: (1) allocation of idle time, (2) pretranslation of accelerator and other messages, (3) notification of program state changes, and (4) pushing the main message loop. The component manager and the cooperating components define standard interfaces for introducing new components into the application program. Thus, these new components may share in the message loop services without having to duplicate the message loop processing code, and without developing parallel execution stacks.

Generally described, the invention provides a component manager for an application program. The application program includes a plurality of components and a message queue. The message queue receives and stores input messages, and each component is configured for executing a procedure, such as Ia window procedure, in response to received input messages. The component manager controls the message loop of the application program. The message loop retrieves input messages from the message queue and dispatches the input messages to the components for further processing. The component manager receives activation messages from the components and, in response to the activation messages, maintains a dynamic active component pointer indicating an active component. This allows the component manager to dispatch the input messages to the active component when several components are running in a single thread.

The component manager may also maintain a dynamic registration list for the components. The dynamic registration list includes an idle time flag for each component that has idle time tasks to perform. The component manager allocates the idle time to the components that have registered with the component manager and set their respective idle time flags.

The component manager may also dispatch a particular input message to the active component and, before the active component has finished processing the particular input message, the component manager may receive a push message loop message. In response to the push message loop message, the component manager continues processing the message loop. The component manager may receive the push message loop message from the active component or another module of the application program.

The component manager may also determine whether a particular input message is an accelerator message. If the particular input message is an accelerator message, the component manager calls an accelerator function of the application program. In addition, the dynamic registration list maintained by the component manager may include a pretranslate message flag for each component that has pretranslation tasks to perform. If the active component has its pretranslate message flag set, the component manager passes the input messages to the active component prior to the step of determining whether the particular input message is an accelerator message.

The component manager may also receive tracking messages from the components. In response to the tracking messages, the component manager maintains a dynamic tracking component pointer. The component manager may receive a begin tracking message indicating a tracking component. In response to the begin tracking message, the component manager suspends the dispatching of the input messages to the active component and initiates the dispatching the input messages to the tracking component. The component manager may then receive an end tracking message. In response to the end tracking message, the component manager ends the dispatching of the input messages to the tracking component and resumes the dispatching the input messages to the active component.

The dynamic registration list maintained by the component manager may also include a state change notification flag for each component that wants notification of program state changes of the application program. The component manager may receive a state change message indicating a change in the state of the application program. In response to the state change message, the component manager sends a notification of program state change message to each component in the registration list that has its respective state change notification flag set. The component manager may receive the state change message from the active component or another module of the application program.

More specifically, the dynamic registration list maintained by the component manager may include an idle time flag for each component that has idle time tasks to perform, a pretranslate message flag for each component that has pretranslation tasks to perform, and a state change notification flag for each component that wants notification of program state changes. The component manager may receive an update registration message from a particular component. In response to the update registration message, the component manager may change the status of the idle time flag, the pretranslate message flag, or the state change notification flag for the particular component.

The component manager may also transmit a termination query message to a particular component. In response to the termination query message, the component manager may receive a negative termination response message from the particular component. In response to the negative termination response message, the component manager waits a predetermined period of time and then transmits a second termination query message to the particular component. In response the second termination query message, the component manager may receive a positive termination response message from the particular component. In response to the positive termination response message, the component manager may transmit a terminate message to the particular component.

The invention thus provides a component manager that controls the main message loop of an application program and allows a multiplicity of components to share in main message loop services. That the invention improves over the drawbacks of prior art component integration systems and accomplishes these advantages will become apparent from the following detailed description and the appended drawings and claims.

DETAILED DESCRIPTION OF THE PREFERRED EMBODIMENTS

Figure 1:
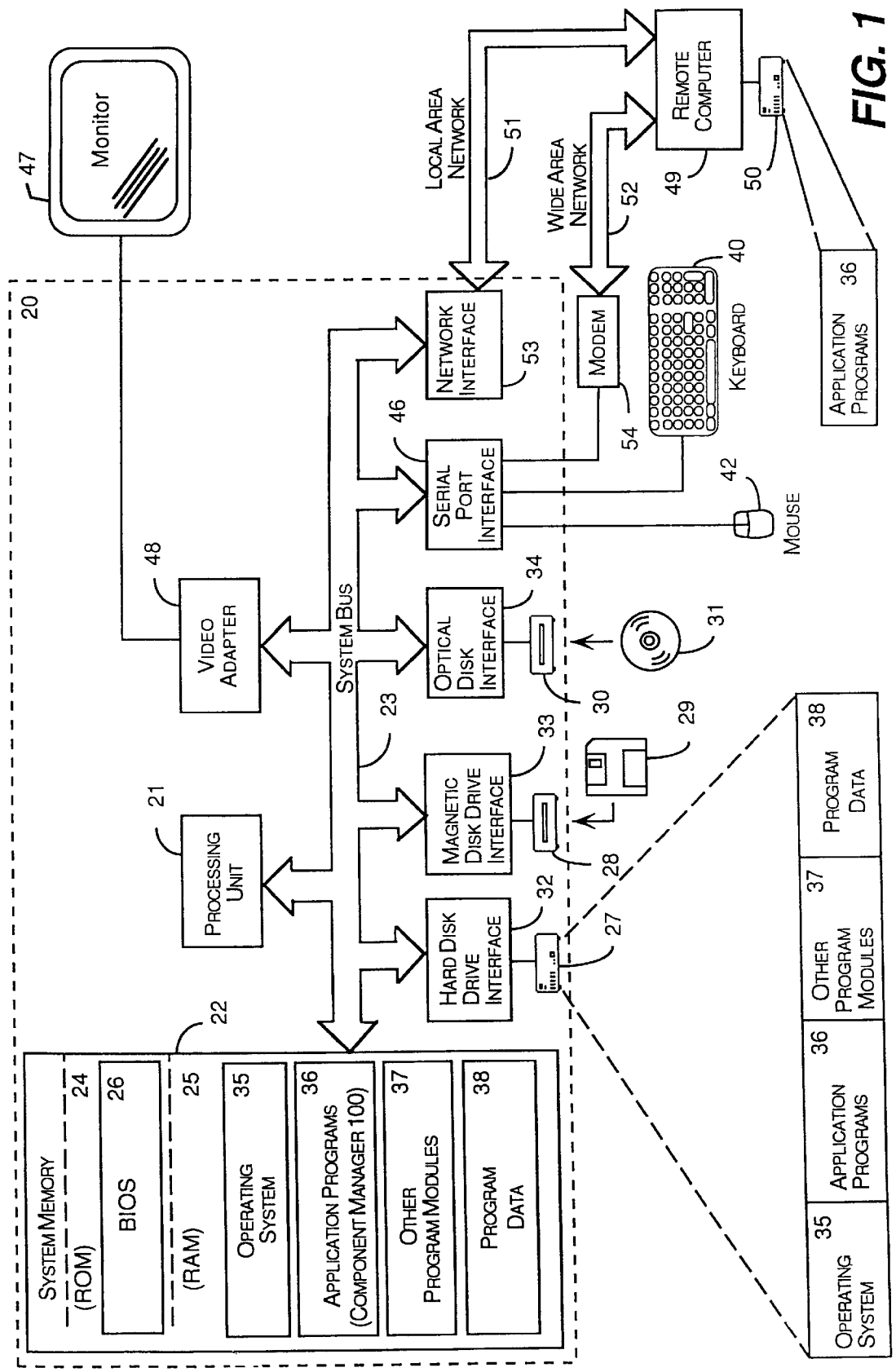
FIG. 1 is a functional block diagram of a personal computer system that provides the operating environment for the exemplary embodiments of the invention.

The present invention is a component integration system for an application program. A component manager controls the main message loop of the application program and allows a multiplicity of components running within a single process to share in main message loop services. If the application program supports multiple threads running within a single process, then the component manager allows a multiplicity of components running within a single thread to share in main message loop services. Specifically, the component manager routes messages from the main message queue to the various components and allows the components to share in the following services: (1) allocation of idle time, (2) pretranslation of accelerator and other messages, (3) notification of program state changes, and (4) pushing the main message loop. The component manager and the cooperating components define standard interfaces for introducing new components into the application program. Thus, these new components may share in the message loop services without having to duplicate the message loop processing code, and without developing parallel execution stacks.

Referring now to the drawings, in which like numerals indicate like elements throughout the several figures, the preferred embodiments of the invention will be described below with reference to the appended drawings. Generally, FIG. 1 illustrates the operating environment of an exemplary embodiment of the present invention.

Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both map entity and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. In particular, one or more of application programs 36 each include a component manager 100 that embodies certain aspects of the invention, which are described below with reference to FIGS. 2–11. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a map entity area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are incorporated into the OFFICE 97 suite of application programs, as well as VISUAL BASIC, VBA, VISUAL STUDIO 97, and PROJECT 97, all of which are sold by Microsoft Corporation for use with personal computer systems such as the illustrative personal computer 20. It will be appreciated that the principles of the present invention are not limited to any particular application program, but could equivalently be applied to any computer-implemented system for providing main message loop services to the components of an application program. For example, it is anticipated that the present invention will be incorporated into future versions of Microsoft's OFFICE, VISUAL BASIC, VISUAL STUDIO, and PROJECT products and may also be incorporated into other products, such as multimedia products, Internet products, and the like.

It will further be appreciated that these exemplary application programs could equivalently be implemented on host computers other than personal computers, and could equivalently be transmitted to the host computer by means other than a CD-ROM, for example, by way of the network connection port 24. Nevertheless, the innovations described herein are specifically designed to produce acceptable performance of the component manager 100 when implemented on a conventional personal computer system 20.

The Component Integration System

Figure 2:
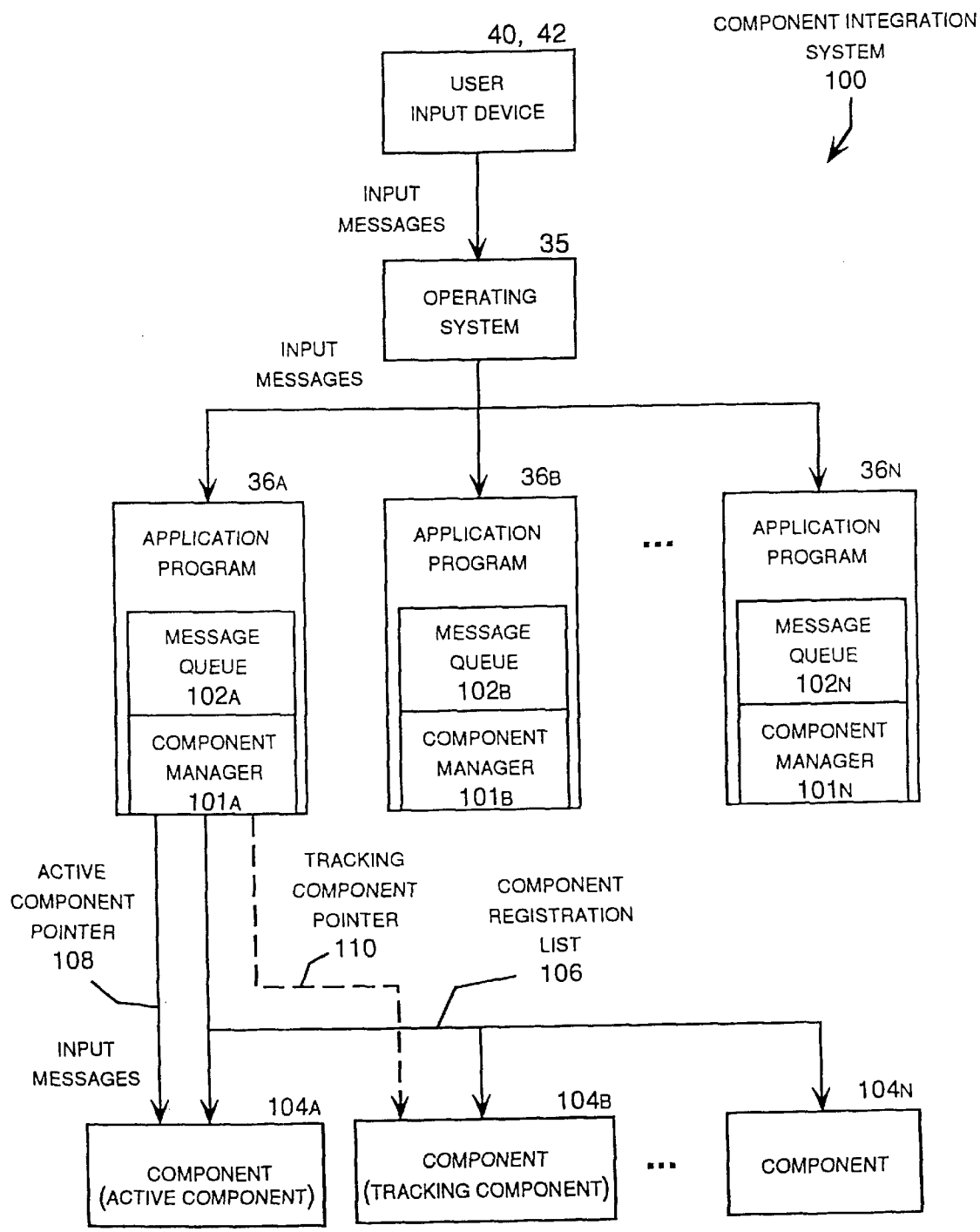
FIG. 2 is a functional block diagram that illustrates the architecture of a component integration system using a component manager for each of several application programs.

FIG. 2 is a functional block diagram that illustrates the architecture of a component integration system 100 using a component manager for each of several application programs. An operating system 35 and a number of application programs 36a–36n are currently running on the computer system 20. A user activates (i.e., gives the focus to) a particular application program by inputting a predefined activation message, typically through a point-and click command with the mouse 42 pointer on a top level portion of the desired application program. The operating system 35 then receives general input messages from the user input devices, such as the keyboard 40 and the mouse 42, and dispatches the message to the active application program. The procedures that allow the operating system 35 to keeps track of which application program has the focus are well known to those skilled in the art and will not be described further.

Each application program 36 includes a component manager 101, a main message queue 102, and a multiplicity of cooperating components 104. This is illustrated by the application program 36a, which includes a component manager 101a, a main message queue 102a, and a multiplicity of cooperating components 104a–n. Input messages received from the operating system 35 are placed into the main message queue 102a. The application program 36a executes a main message loop to read the input messages from a main message queue 102a and dispatch the input messages to the appropriate components 104a–n in an orderly manner. The component manager 101a controls this main message loop, routes the input messages from the main message queue 102a to the various components 104a–n, and allows the components to share in various services provides by the main message loop.

Just as the user can activate a particular application program 36a, the user can also activate a particular one of the components 104a of the application program by inputting a predefined activation message. In addition, many components may be simultaneously instantiated, and the set of instantiated components changes dynamically as the user operates the computer system 20, opening windows, closing windows, selecting functions, and so forth. The application program 36a therefore needs a mechanism to keep track of which components are instantiated, and which component has the focus, at all times.

This function is provided by the component manager 101a, which includes a component registration list 106. The various components 104a–n typically register with the component manager 101a when they are instantiated, and revoke their registration when they are terminated. Thus, the component registration list 106 changes dynamically as the user operates the computer system, opening windows, closing windows, selecting functions, and so forth. The components 104a–n may subscribe to the various main message loop services provided by the component manager 101a by setting various registration flags at the time of registration. These registration flags and the interfaces that allow the component manager 101a and the components 104a–n to communicate with each other are described with reference to FIG. 3.

The component manager 101a also maintains an active component pointer 108 to keep track of which component has the focus. Because the components 104a–n in general, and post-release components in particular, may be configured to activate in response to messages or component-to-component interactions that the component manager 101a may not be aware of, the active component pointer 108 is preferably maintained in response to activation notification messages from the components.

The component manager 101a also maintains a tracking component pointer 110 to keep track of a tracking component that may temporarily receive general input messages while another component has the focus. This allows input messages to be temporarily diverted from an active component without having to deactivate the active component and activate another component. The use of a tracking component increases component programming flexibility and is particularly useful for implementing modal state operations, such as mouse tracking in drawing operations. Like the active component pointer 108, the tracking component pointer 110 is preferably maintained in response to tracking notification messages from the components.

Figure 3:
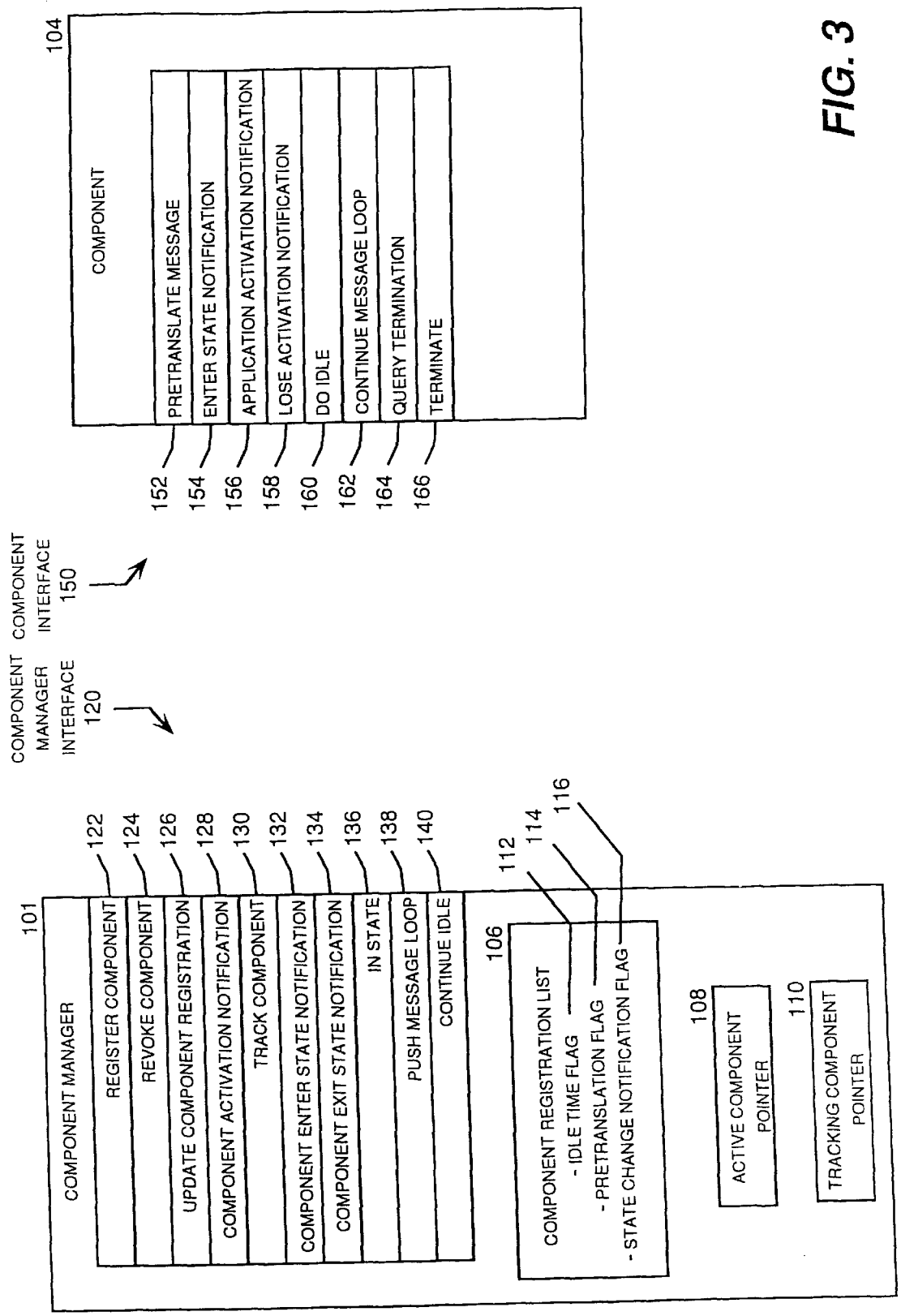
FIG. 3 is a block diagram illustrating a component manager interface and a component interface in the component integration system of FIG. 2.

FIG. 3 is a block diagram illustrating the architecture of a component manager 101 and a component 104. As noted previously, the component manager maintains a component registration list 106, an active component pointer 108, and a tracking component pointer 110. The component registration list 106 includes a number of registration flags that may be set by the component 104 at the time of registration. The component 104 may also change the status of its registration flags while it remains registered with the component manager 101. The registration flags allow the components 104 to subscribe to the various main message loop services provided by the component manager 101, including (1) allocation of idle time, (2) pretranslation of accelerator and other messages, (3) notification of program state changes, and (4) pushing the main message loop.

The registration flags include an idle time flag 112, a pretranslation flag 114, and a state change notification flag 116. The idle time flag 112 has three states: (1) Off—the component does not need idle time; (2) On—the component needs idle time; and (3) On Periodically—the component needs idle time periodically at an interval specified in the registration command. The pretranslation flag 114 has three states: (1) Off—the component does want to translate input messages before the component manager; (2) On for Keyboard—the component wants an opportunity to translate keyboard messages before the component manager; and (3) On for All—the component wants an opportunity to translate input messages before the component manager. The state change notification flag 116 allows a component to ask for notification of any combination of the following program state changes: (1) modal state changes; (2) redraw on or off, and (3) warning messages on or off.

The component manager 101 defines a standard interface 120 that allows the component 104, including a post-release component, to communicating with the component manager. The component manager interface 120 defines a syntax for a number of predefined instructions, which are referred as methods. Specifically, the component manager interface 120 defines a register component method 122 that allows the component 104 to register with the component manager 101. In response to the register component method 122, the component manager enters the registering component on the component registration list 106. Although the component 104 may register upon instantiation, it may also defer registration until a later time, as defined by the internal programming of the component. For example, the component 104 may defer registration until it receives the focus or until it determines that it should subscribe to one or more of the services provided by the component manager 101. The component 104 typically sets one or more of the registration flags as part of the register component method 122.

The component manager interface 120 also defines a revoke component method 124 that allows the component 104 to remove itself from the component registration list 106. Although the component 104 typically revokes its registration when it is terminated, it may also revoke its registration at any other time, as defined by the internal programming of the component. For example, the component 104 may revoke its registration when it loses the focus or when it determines that it should no longer subscribe to any of the services provided by the component manager 101.

The component manager interface 120 also defines an update component registration method 126 that allows the component 104 to change the status of one or more of its registration flags while the component remains registered with the component manager. This method allows the component 104 to change the main message loop services that the component subscribes to from time to time, as defined by the internal programming of the component.

The component manager interface 120 also defines a component activation notification method 128 that allows the component 104 to notify the component manager 101 when the component receives the focus. Each component should use the component activation notification method 128 to notify the component manager 101 whenever the component receives the focus. This method allows the component manager 101 to maintain the active component pointer 106.

The component manager interface 120 also defines a track component method 130 that allows the component 104 to notify the component manager 101 when the component becomes a tracking component. The component 104 initiates tracking by using the track component method 130 with a "true" parameter. The component 104 subsequently ends tracking by using the track component method 130 with a "false" parameter. Each component should use the track component method 130 to notify the component manager 101 whenever the component becomes a tracking component. This method allows the component manager 101 to maintain the tracking component pointer 110.

The component manager interface 120 also defines a component enter state notification method 132 that allows the component 104 to notify the component manager 101 when the component enters a modal state or turns on a global state parameter, such as redraw, or warning messages. Each component should use the component enter state notification method 132 to notify the component manager 101 whenever the component enters a modal state or turns on a global state parameter so that the component manager 101, in turn, can send state change notification messages to the other components that have registered for the state change notification service.

The component manager interface 120 also defines a component exit state notification method 134 that allows the component 104 to notify the component manager 101 when the component exits a modal state or turns off a global state parameter, such as redraw, or warning messages. Each component should use the component exit state notification method 134 to notify the component manager 101 whenever the component exits a modal state or turns off a global state parameter so that the component manager 101, in turn, can send state change notification messages to the other components that have registered for state change notification services.

The component manager interface 120 also defines an in state method 136 that allows the component 104 or another module of the application program 36 to query the component manager 101 to determine the current status of global state parameters, such as modal state, redraw, or warning messages. The requesting module includes a state identification parameter with the in state method 136 that indicates a global state parameter that is the subject of the inquiry. The component manager 101 responds to the in state method 136 with a response message indicating the current status of the subject global state parameter.

The component manager interface 120 also defines a push message loop method 136 that allows the component 104 to instruct the component manager 101 to resume processing the main message loop. This method is typically used when a component 104 needs user input to complete processing of a message, or wants to allow idle task processing to occur while the component is executing a function. The push message loop method 136 allows input message to be dispatched and idle time to be allocated without the active component having to first return from a previously dispatched input message. The pushing module may include a parameter with the push message loop method 136 that indicates the reason for the push of the message loop.

After the message loop has been pushed, the component manager 101 checks periodically with the active component (using the continue message loop method 162, which is described below with reference to the component interface 150) to determine whether to continue processing the main message loop. A "true" response to the continue idle method 162 causes the component manager 101 to continue processing the main message loop, and a "false" continue idle method causes the component manager 101 to stop processing the main message loop. A "false" response to the continue idle method 162 allows the active component to return from the dispatched input message that the active component was processing when the message loop was pushed.

The component manager interface 120 also defines a continue idle method 140 that allows the component 104 to continue an allocation of idle time to the component 104. That is, after the component manager 101 allocates idle time to the component 104 (using the do idle method 160, which is described below with reference to the component interface 150), the component uses the continue idle method 140 to periodically check with the component manager to determine whether the component should continue with its idle time tasks. A "true" response to the continue idle method 140 causes the component 104 to continue processing its idle time tasks, and a "false" response to the continue idle method causes the component to stop processing its idle time tasks.

Referring now to the component 104, it defines a standard interface 150 that allows the component manager 101 and the other components of the application program 36 and the operating system 35 to communicate with the component. The standard component interface 120 allows components, including a post-release component, to be configured to cooperate properly with the component manager 101 and the other components of the application program 36 and the operating system 35.

The component interface 150 defines a pretranslate message method 152. When the component 104 is has the focus, the component manager 101 uses this method to pass an input message to the component 104 for processing prior to processing by the component manager 101. This gives the component 104 an opportunity to handle the input message before the component manager 101 processes the input message. Thus, the component 104 may execute function calls in response to accelerator message directed to the component 104. If the component 104 handles the message, it returns "true" to indicate that it has consumed the message. If the component 104 does not handle the message, it returns "false" to pass the input message back to the component manager 101. The component 104 subscribes for pretranslation processing by setting its pretranslation flag 114.

The component interface 150 also defines an enter state notification method 154. The component manager 101 uses this method to notify the component 104 of global program state changes caused by other components, the application program 36, or the operating system 35. For example, the component manager 101 receives notification of program state changes from the components by way of the component enter state notification method 132 and the component exit state notification method 134. The component manager 101 uses the enter state notification method 154 to relay these notifications to the other components that have their state notification flags 116 set. The component 104 subscribes for state change notification by setting its state change notification flag 116.

The component interface 150 also defines an application activation notification method 156. The component manager 101 uses this method to notify the component 104 that the application program 36 has been activated. The component 104 may then perform any functions that are necessary to ready the component for activation. Although a component is usually activated as part of the input message dispatching process, other processes including operating system and component-to-component processes, may activate a component. Upon being activated, the component 104 notifies the component manager 101 using the component activation notification method 128.

The component interface 150 also defines a lose activation notification method 158. The component manager 101 uses this method to inform the component 104 that it has lost the focus to another component 104. Because only one component can have the focus at any given time, the component manager 101 uses the lose activation notification method 158 to notify the previously-active component of a change in the focus. The component manager 101 received notification of the change in the focus from the activated component using the component activation notification method 128.

The component interface 150 also defines a do idle method 160. The component manager 101 uses this method to allocate idle time to the component. The component 104 subscribes for idle time allocation by setting its idle time flag 112. In response the do idle method 160, the component 104 performs its idle time tasks.

The component interface 150 also defines a continue message loop method 162. In response to an idle condition, a need for user input, or some other condition defined by a module, the component 104 or another module may use this method to push the message loop while the component 104 has the focus. After the message loop has been pushed, the component manager 101 uses the continue message loop method 162 to periodically check with the component 104 to determine whether to continue the message loop. The component 104 returns "true" to continue the message loop and "false" to return from the function that the component was executing the message loop was pushed.

The component interface 150 also defines a query terminate method 164. The component manager 101 uses this method to prepare the component 104 for termination. If the component 104 is ready to terminate, it returns "true." If the component 104 is not ready to terminate, it returns "false" and conducts whatever pretermination functions are required to terminate, such as ending a modal state or asking the user whether it should finish a background idle time task before termination.

The component interface 150 also defines a terminate method 166. The component manager 101 uses this method to terminate the component 104, typically when the component ceases to be instantiated, when the application program 36 quits, and during shut down of the computer system 20.

Figure 4:
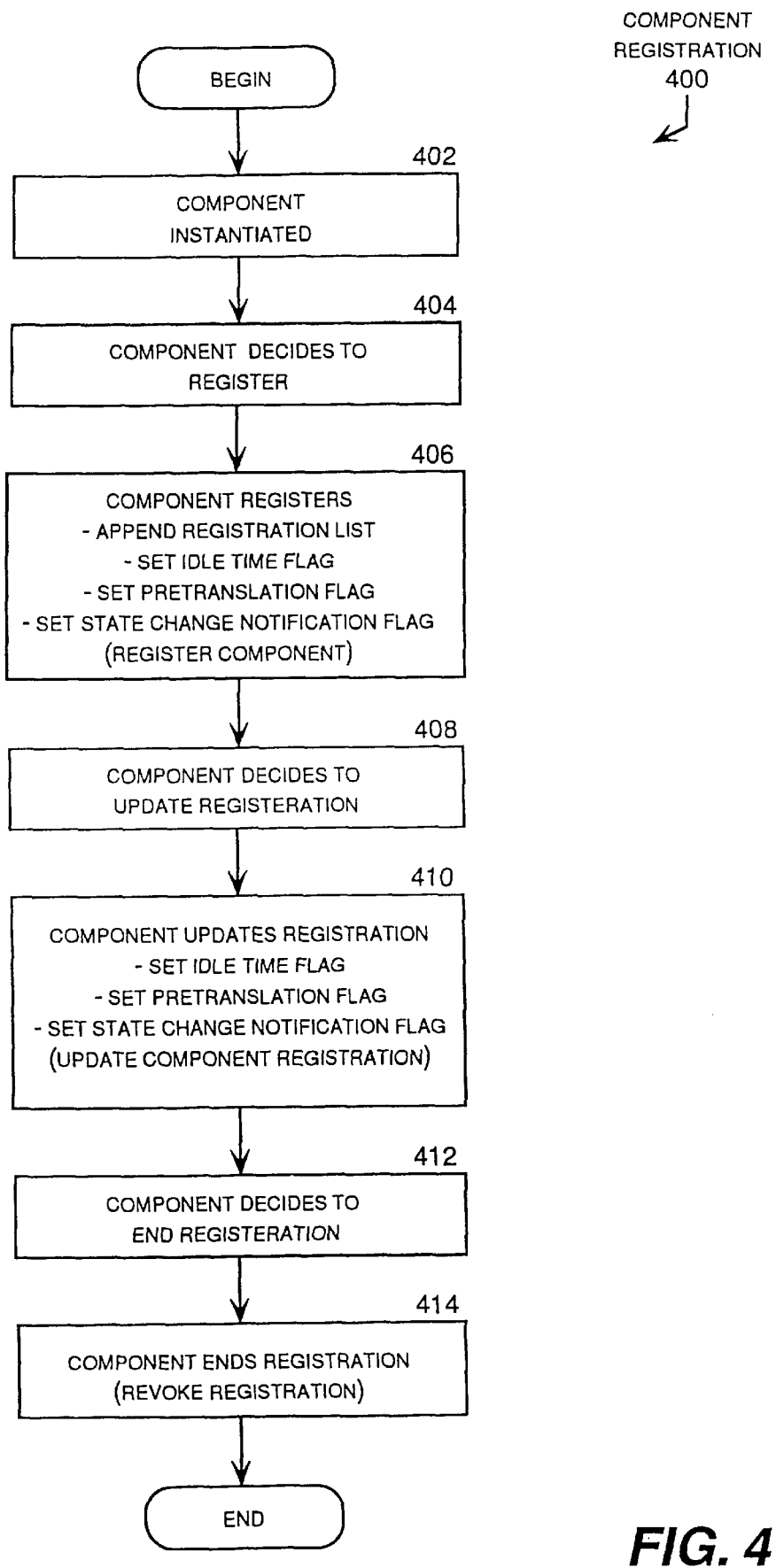
FIG. 4 is a logic flow diagram illustrating a component registration routine for the component integration system of FIG. 2.

FIG. 4 is a logic flow diagram illustrating a component registration routine 400 for the component integration system 100. In step 402, the component 104 is instantiated. In step 404, the component 104 decides to register with the component manager 101, usually to subscribe to one or more of the main message loop services provided by the component manager. In step 406, the component 104 registers with the component manager 101 using the register component method 122. In response to the register component method 122, the component manager 101 adds the component 104 to the component registration list 106. Also in response to the register component method 122, the component manager 101 may set the idle time flag 112, the pretranslation flag 114, and/or the state change notification flag 116 for the component 104.

In step 408, the component 104 may decide to update its registration to change the status of its idle time flag 112, pretranslation flag 114, and/or state change notification flag 116. In step 410, the component 104 uses the update component registration method 126 to update its registration. In response to the update component method 126, the component manager 101 changes the status of the idle time flag 112, the pretranslation flag 114, and/or the state change notification flag 116 for the component 104.

In step 412, the component 104 may decide to end its registration. In step 412, the component 104 uses the revoke component method 124 to end its registration. In response to this method, in step 414 the component manager 101 deletes the component 104 from the component registration list 106. Step 414 is followed by the "end" step. It will be appreciated that the steps of routine 400 need not be executed exactly in the order shown, but rather the component 104 may update its registration any number of times after registration and prior to ending its registration.

Figure 5:
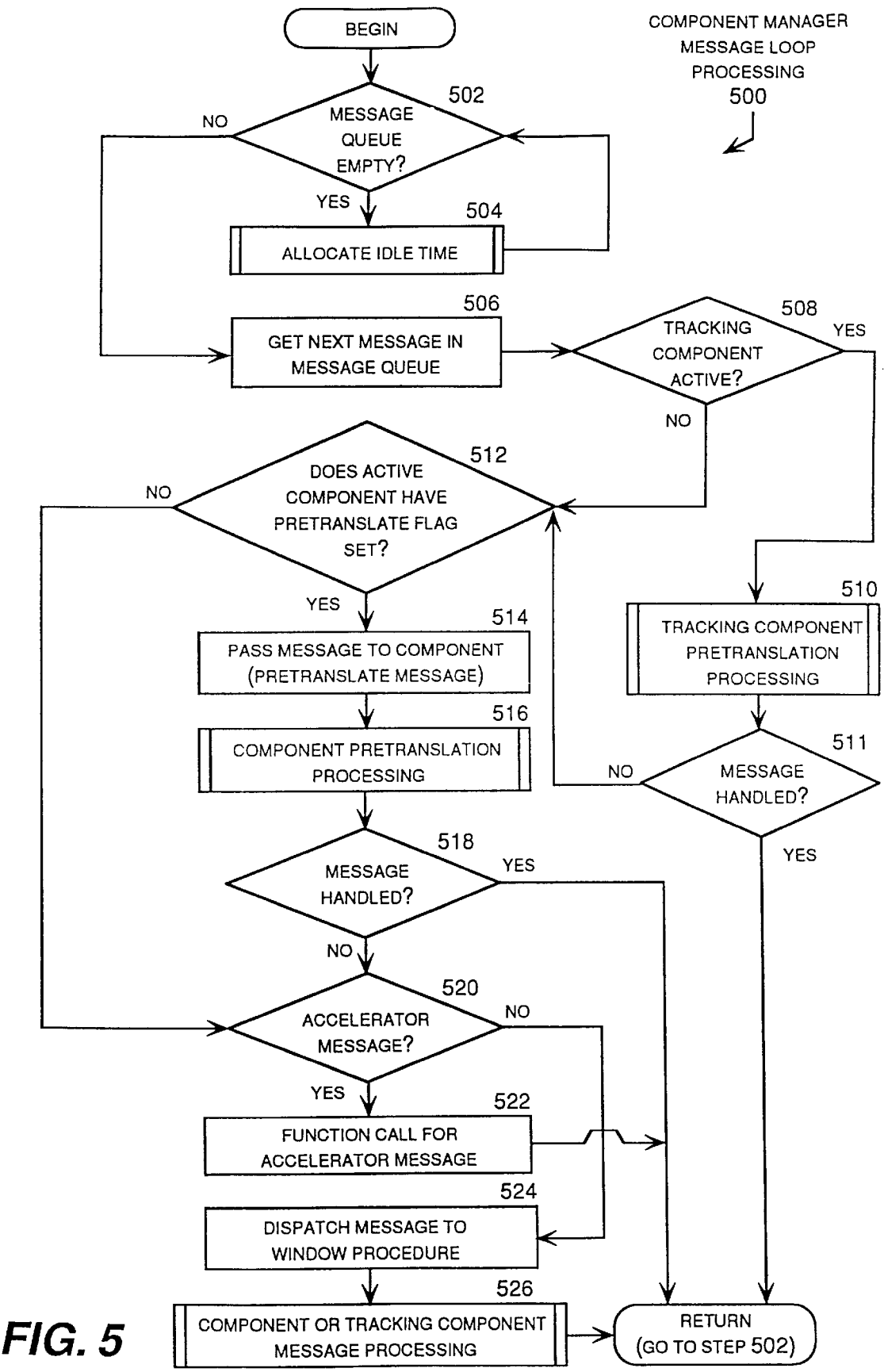
FIG. 5 is a logic flow diagram illustrating a message loop processing routine for the component integration system of FIG. 2.

FIG. 5 is a logic flow diagram illustrating a main message loop processing routine 500 for the component manager 101. In step 502, the component manager 101 determines whether the message queue 102 is empty, which indicates an idle condition. If the message queue 102 is empty, the "yes" branch is followed to routine 504, in which the component manager 101 allocates idle time to the components that have subscribed for this service. Routine 504 is described with reference to FIG. 7.

If the message queue 102 is not empty, the "no" branch is followed to step 506, in which the component manager 101 gets the next message in the message queue 102. In step 508, the component manager 101 checks the tracking component pointer 110 to determines whether a tracking component is active. If the tracking component pointer 110 indicates that a tracking component is active, the "yes" branch is followed to routine 510, in which the tracking component may be given the opportunity to conduct pretranslation processing on the message. Routine 510 is described with reference to FIG. 6. Routine 510 is followed by step 511, in which the component manager 101 determines whether the tracking component handled the input message. If the tracking component handled the input message, the "yes" branch is followed to the "return" step, which loops to step 502.

If the tracking component did not handle the input message, the "no" branch is followed from step 511 to step 512. In addition, referring again to step 508, if there is not a tracking component active (i.e., tracking component pointer 110 is set to null), the "no" branch is followed from step 508 to step 512. In step 512, the component manager 101 determines whether the active component has its pretranslation flag 114 set. If the active component has its pretranslation flag 114 set, the "yes" branch is followed to step 514, in which the component manager 101 uses the pretranslate message method 152 to pass the message to the active component. In routine 516, the active component executes pretranslation processing. Routine 516 is described with reference to FIGS. 8A and 8B.

Routine 516 is followed by step 518, in which the component manager 101 determines whether the active component handled the input message. If the active component handled the input message, the "yes" branch is followed to the "return" step, which loops to step 502. If the active component did not handle the input message, the "no" branch is followed to step 520, in which the component manager 101 determines whether input message is a recognizable accelerator message. If the input message is a recognizable accelerator message, the "yes" branch is followed to step 522, in which the component manager 101 executes the appropriate function call for the accelerator message. Step 522 is followed by the "return" step, which loops to step 502.

Figure 9:
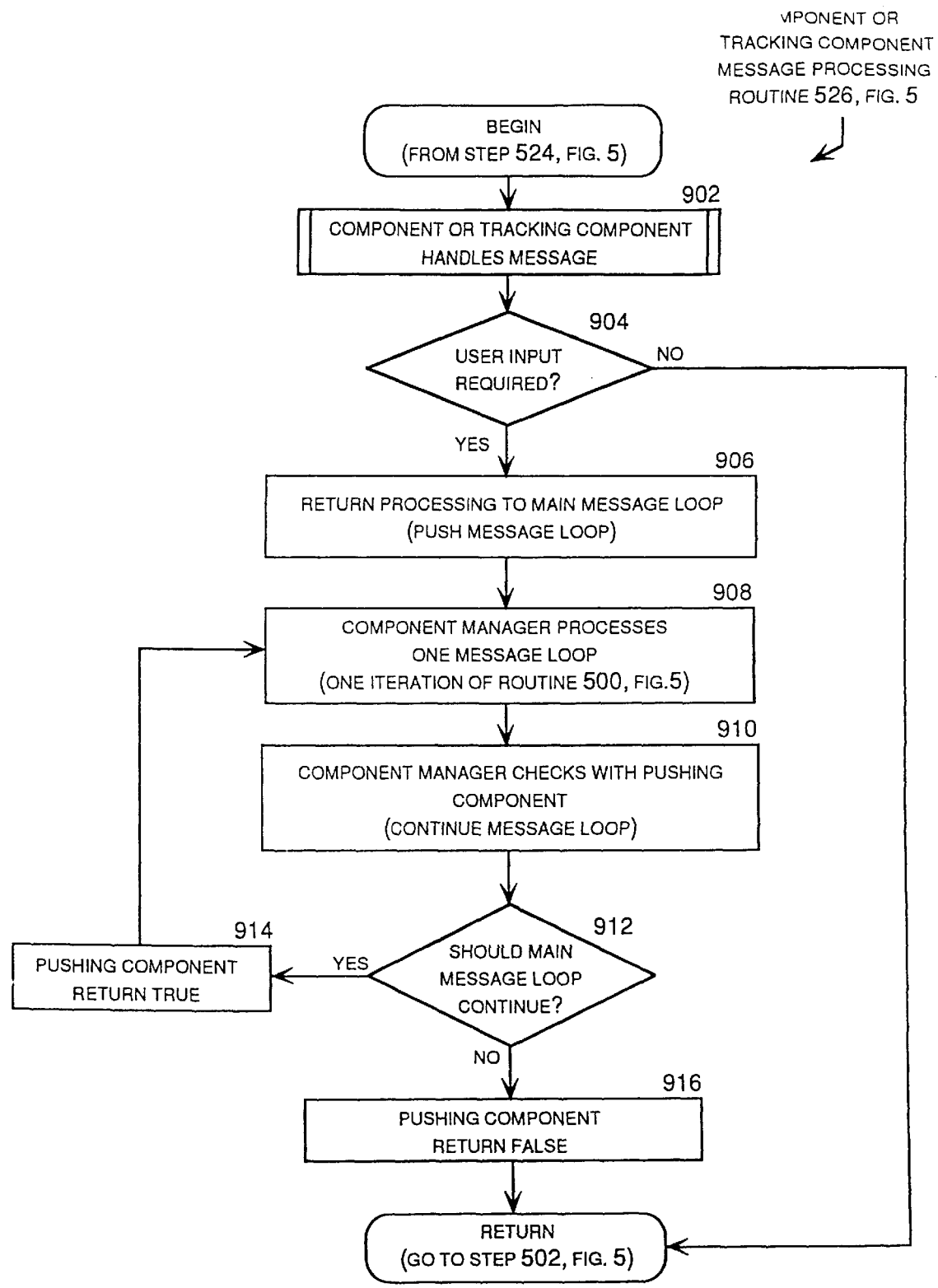
FIG. 9 is a logic flow diagram illustrating a tracking component message processing routine for the component integration system of FIG. 2.

If the input message is not a recognizable accelerator message, the "no" branch is followed to step 524, in which the component manager 101 dispatches the input message to the appropriate component (i.e., the appropriate window procedure). It will be appreciated that dispatched message may be a general input message, such as a keyboard message, in which case the message is dispatched to the active component. Alternatively, the dispatched message may be an activation message that changes the active component, or it may be a tracking message that activates or deactivates a tracking component. Therefore, the message is processed by the previously-active component, the newly activated component, or the active tracking component in routine 526. Routine 526, which is described with reference to FIG. 9, is followed by the "return" step, which loops to step 502.

Figure 6:
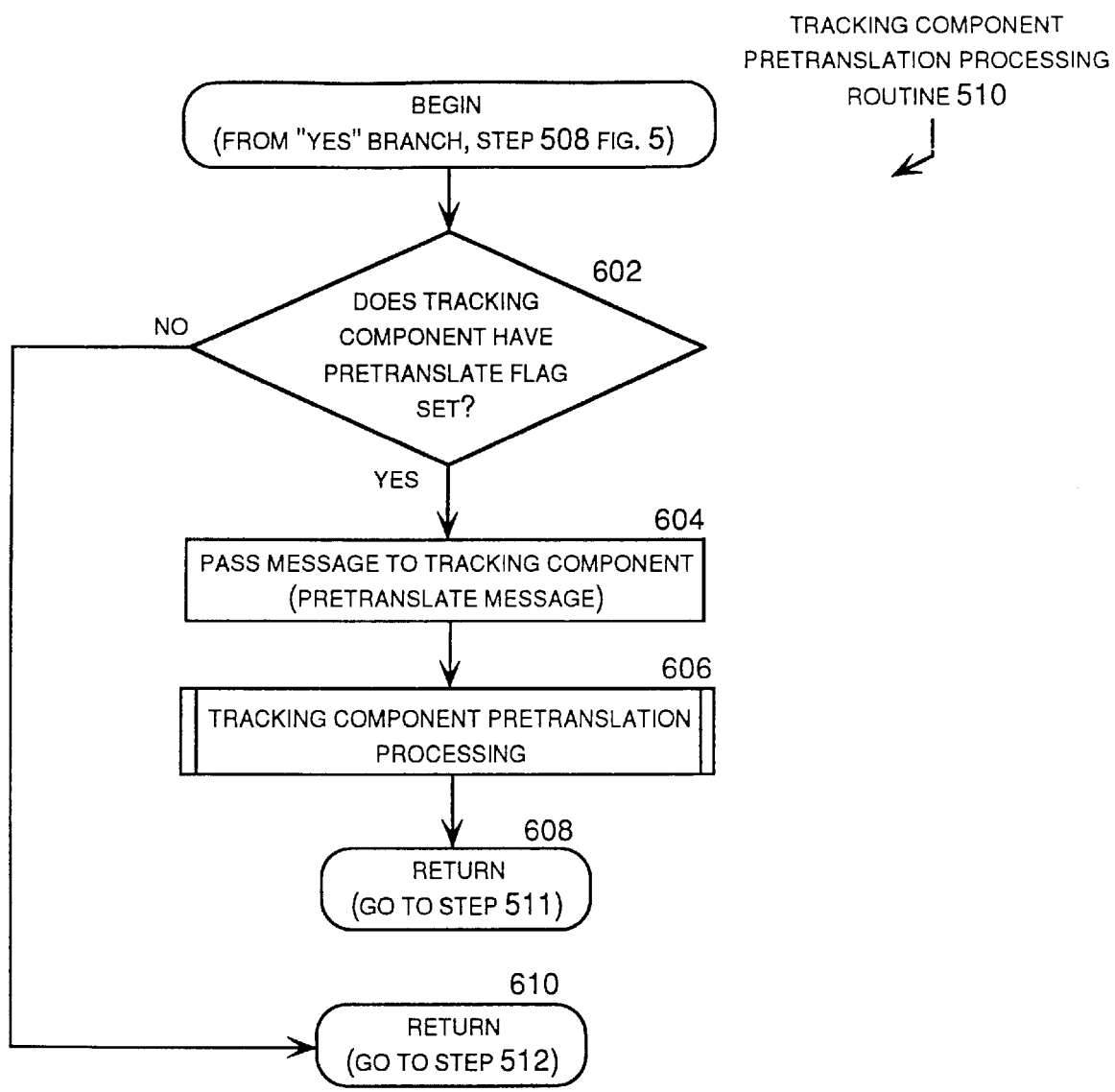
FIG. 6 is a logic flow diagram illustrating a tracking component pretranslation routine for the component integration system of FIG. 2.

FIG. 6 is a logic flow diagram illustrating routine 510 for tracking component pretranslation. Routine 510 follows the "yes" branch from step 508 shown on FIG. 5. In step 602, the component manager 101 determines whether the tracking component has its pretranslation flag 114 set. If the tracking component does not have its pretranslation flag 114 set, the "no" branch is followed to the "return" step 610, which return to step 512 shown on FIG. 5.

If the tracking component has its pretranslation flag 114 set, the "yes" branch is followed to step 604, in which the component manager 101 uses the pretranslate message method 152 to pass the message to the tracking component. In routine 606, the tracking component executes pretranslation processing. Routine 606 is described with reference to FIGS. 8A and 8B. Routine 606 is followed by the "return" step 680, which return to step 511 shown of FIG. 5.

Figure 7:
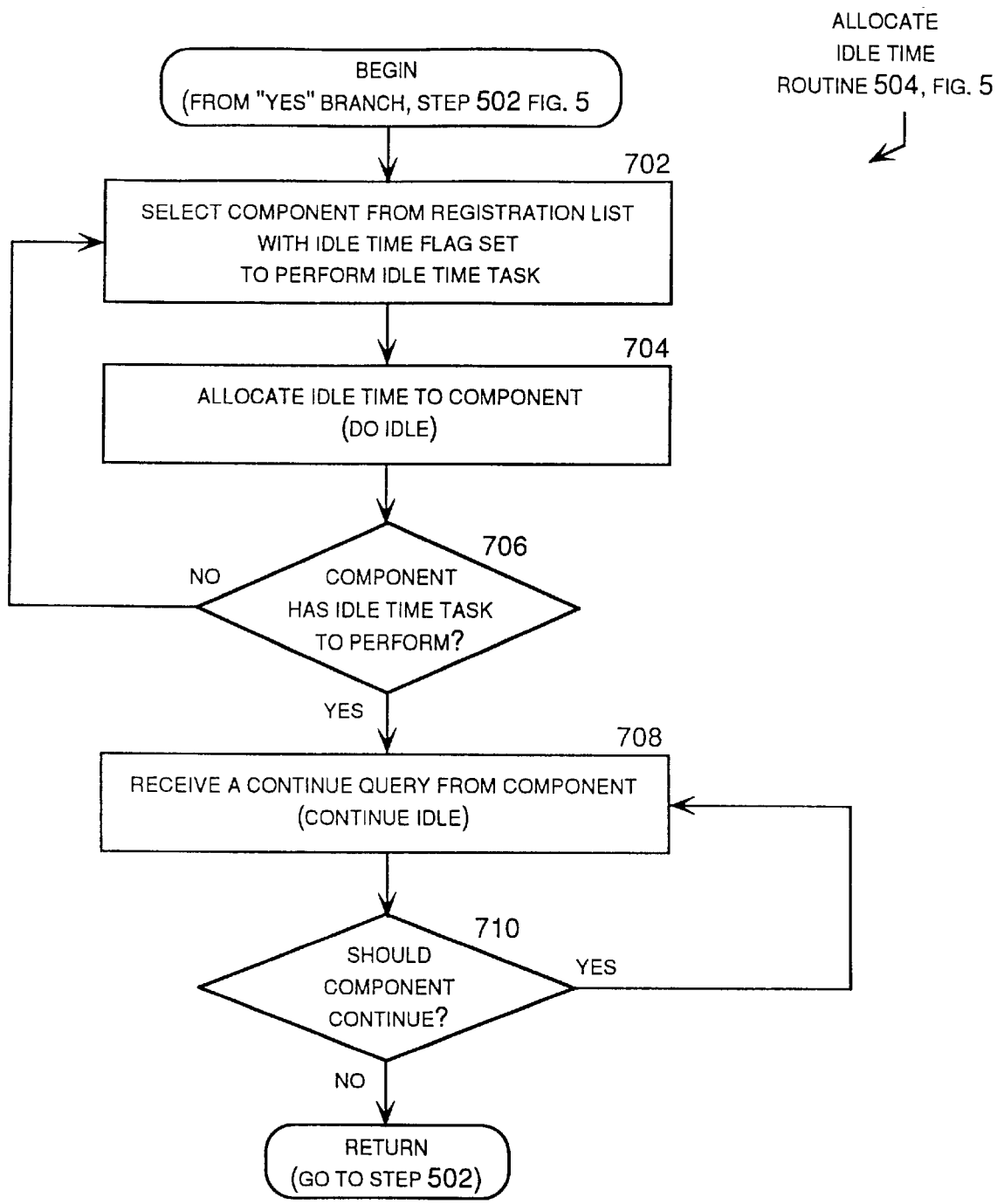
FIG. 7 is a logic flow diagram illustrating an idle time allocation routine for the component integration system of FIG. 2.

FIG. 7 is a logic flow diagram illustrating routine 504 for idle time allocation. Routine 504 follows the "yes" branch from step 502 shown on FIG. 5. In step 702, the component manager 101 selects a component from the component registration list 106 that has its respective idle time flag 112 set indicating that the component has registered for idle time allocation. Although the allocation methodology typically gives the active component the first opportunity to perform at idle time tasks, many types of allocation methodologies could be executed by the component manager 101, such as priority-based or multiplexed allocation methodologies.

In step 704, the component manager 101 allocates idle time to the selected component using the do idle method 160. In step 706, the selected component determines whether it has idle time tasks to perform. If the selected component does not have idle time tasks to perform, the "no" branch loops to step 702, in which the component manager 101 may select another component to perform idle time tasks. The selected component indicates that it does not have idle time tasks to perform by using the continue idle method 140 with a "false" parameter.

If the selected component has idle time tasks to perform, the "yes" branch is followed to step 708, in which the component performs its idle time tasks for a predetermined period and then uses the continue idle method 140 to check with the component manager 101 to determine whether the component should continue its idle time tasks. In step 710, the component manager 101 may return "true" to the continue idle query, in which case the "yes" branch loops to step 708, and the component continues processing its idle time tasks for another predetermined period. Alternatively, the component manager 101 may return "false" to the query, in which case the "no" branch is followed from step 710 to the "return" step, which return to step 502 shown on FIG. 5.

Figure 8A:
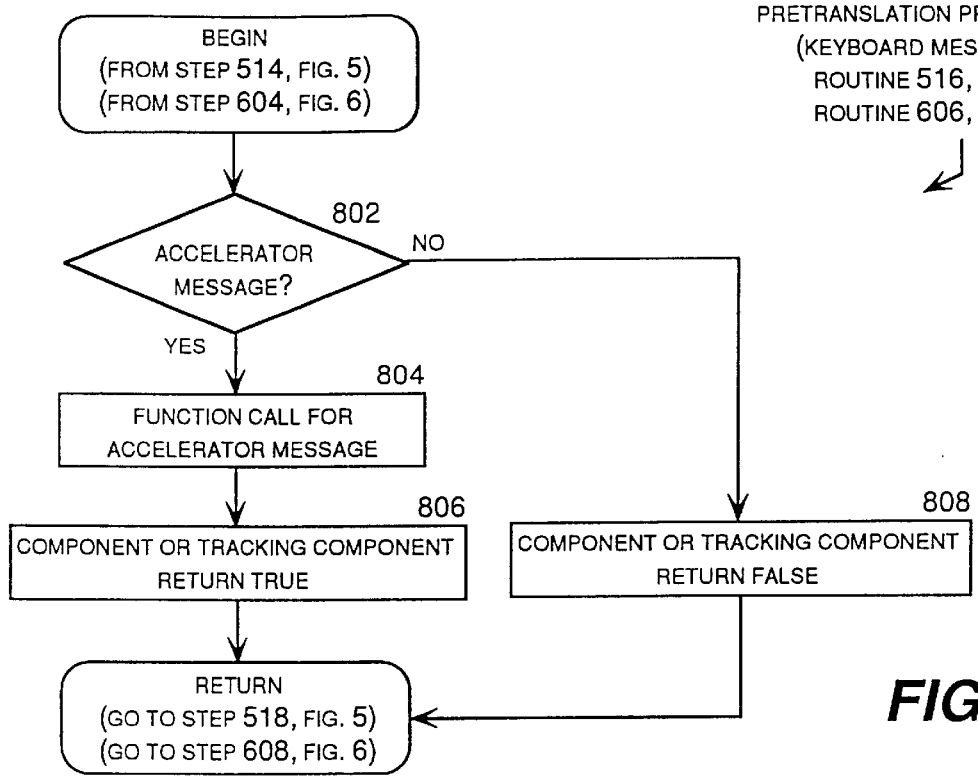
FIG. 8A is a logic flow diagram illustrating a pretranslation routine for keyboard messages for the component integration system of FIG. 2.

FIG. 8A is a logic flow diagram illustrating routines 516 and 606 for pretranslation processing of keyboard messages by an active component and a tracking component, respectively. Routine 516 follows step 514 shown on FIG. 5, and routine 606 follows step 604 shown on FIG. 6. These routines apply when the active component or tracking component has its pretranslation flag 114 set to receive keyboard messages for translation before the component manager 101 translates the keyboard messages. In step 802, the active component or tracking component determines whether the input message is a recognizable accelerator message.

If the input message is a recognizable accelerator message, the "yes" branch is followed from step 802 to step 804, in which the active component or tracking component executes the appropriate function call for the accelerator message. Step 804 is followed by step 806, in which the active component or tracking component returns "true" indicating to the component manager 101 that the message has been consumed. Step 806 is followed by the "return" step, which returns to step 518 or 608 for the active component or tracking component, respectively.

Referring again to step 802, if the input message is not a recognizable accelerator message, the "no" branch is followed to step 808, in which the active component or tracking component returns "false" to pass the input message back to the component manager 101. Step 808 is followed by the "return" step, which returns to step 518 or 608 for the active component or tracking component, respectively.

Figure 8B:
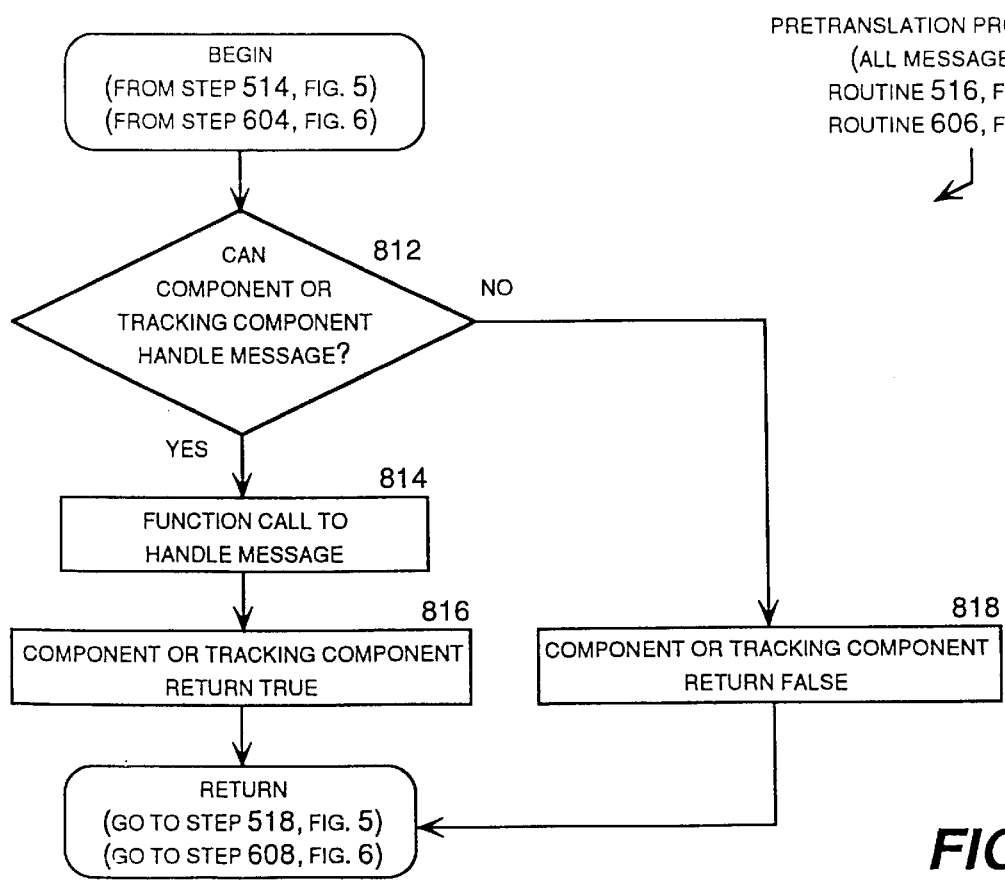
FIG. 8B is a logic flow diagram illustrating a pretranslation routine for all messages for the component integration system of FIG. 2.

FIG. 8B is a logic flow diagram illustrating routines 516 and 606 for pretranslation processing of all messages by an active component and a tracking component, respectively. Routine 516 follows step 514 shown on FIG. 5, and routine 606 follows step 604 shown on FIG. 6. These routines apply when the active component or tracking component has its pretranslation flag set to receive all messages for translation before the component manager 101 translates the messages. In step 802, the active component or tracking component determines whether the input message is a message that the active component or tracking component can handle.

If the input message is a message that the active component or tracking component can handle, the "yes" branch is followed from step 802 to step 804, in which the active component or tracking component executes the appropriate function call or otherwise handles the message. Step 804 is followed by step 806, in which the active component or tracking component returns "true" indicating to the component manager 101 that the message has been consumed. Step 806 is followed by the "return" step, which returns to step 518 or 608 for the active component or tracking component, respectively.

Referring again to step 802, if the input message is not a message that the active component or tracking component can handle, the "no" branch is followed to step 808, in which the active component or tracking component returns "false" to pass the input message back to the component manager 101. Step 808 is followed by the "return" step, which returns to step 518 or 608 for the active component or tracking component, respectively.

FIG. 9 is a logic flow diagram illustrating routine 526 for component message processing. Routine 526 may apply to either an active component or a tracking component that receives a dispatched input message. For convenience, this active component or a tracking component is referred to as the receiving component. Routine 526 follows step 524 shown on FIG. 5, in which the component manager dispatches an input message to the receiving component. In routine 902, the receiving component handles the message. Routine 902 is described with reference to FIG. 10.

Routine 902 is followed by step 904, in which the receiving component determines whether user input is required. If user input is not required, the "no" branch is followed to the "end" step, which returns to step 502 shown on FIG. 5. If user input is required, the "yes" branch is followed to step 906, in which the receiving component uses the push message loop method 138 to instruct the component manager to recursively start processing of the main message loop.

It should be understood that a component other than the receiving component, or another module of the application program 36 or the operating system 35, may also call the push message loop method 138. It should also be understood that the need for user input is only one example of the circumstances that may cause a module to use the push message loop method 138. Many other circumstances may cause a module to use this method, such as the desire to allow idle time tasks to be processed while the receiving component is executing a function, other processes including component-to-component and interrupt messages received from the application program 36 or the operating system 35, or other conditions that program developers may configure into the receiving component or another module.

Step 906 is followed by step 908, in which the component manager 101 processes one iteration of the main message loop (i.e., one iteration of routine 500 shown on FIG. 5). In step 910, the component manager 101 uses the continue message loop method 162 to check with the pushing component (i.e., the component that pushed the message loop) to determine whether to continue processing the main message loop. If the pushing component determines that the component manager 101 should continue processing the main message loop, the "yes" branch is followed to step 914, in which the pushing component returns "true." From step 914, routine 526 loops to step 908, in which the component manager 101 process another iteration of the main message loop. If the pushing component determines that the component manager 101 should not continue processing the main message loop, the "no" branch is followed to step 916, in which the pushing component returns "false." From step 916, routine 526 continues to the "return" step, which returns to step 502 shown on FIG. 5.

Figure 10:
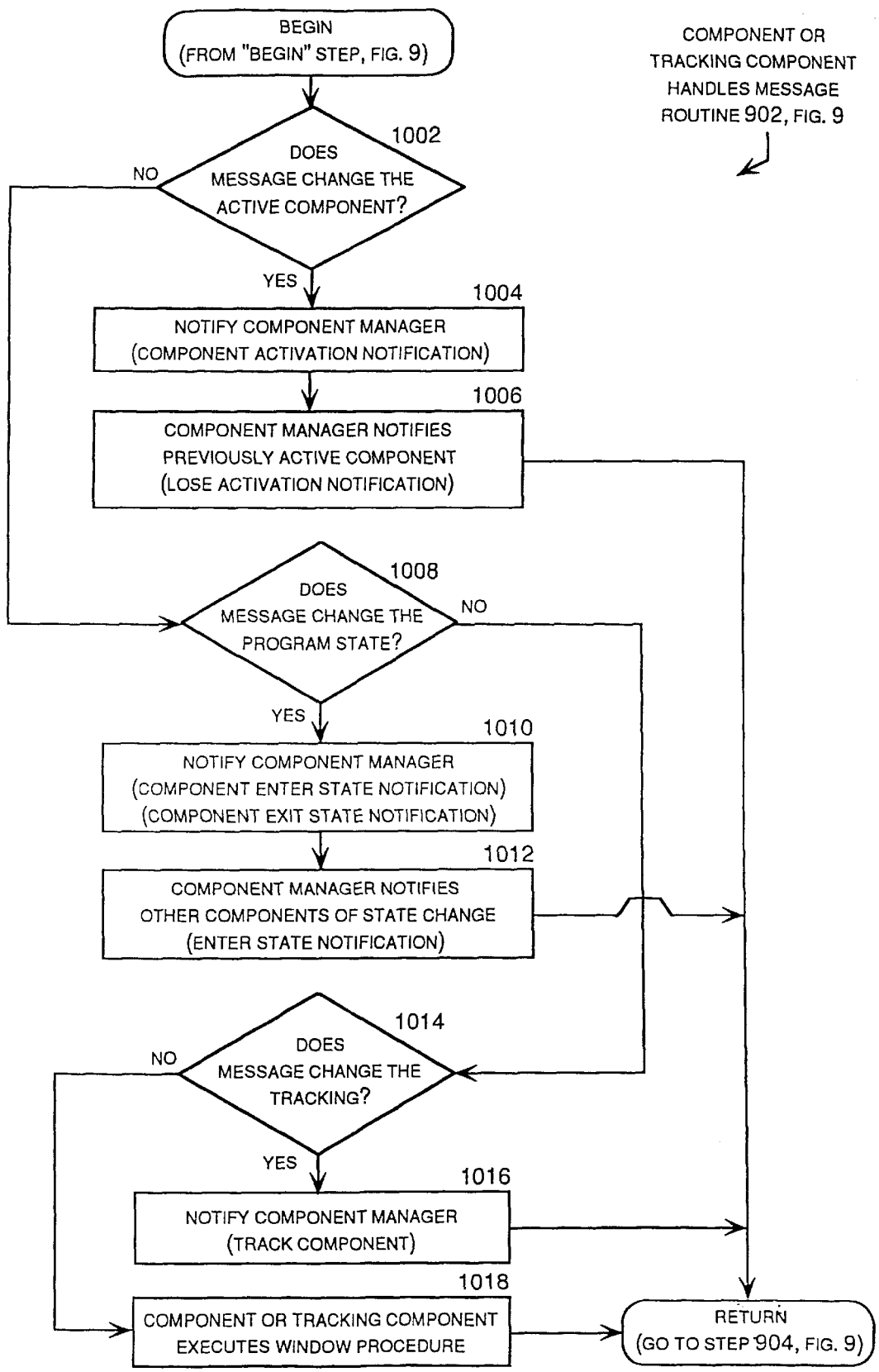
FIG. 10 is a logic flow diagram illustrating a message handling routine for the component integration system of FIG. 2.

FIG. 10 is a logic flow diagram illustrating routine 902 for message handling by the receiving component. In step 1002, the receiving component determines whether the received message activated (i.e., gave the focus to) the receiving component. This occurs when the window procedure receiving the dispatched message, or some other process, activates the component 104. If the received message activated the receiving component, the "yes" branch is followed to step 1004, in which the receiving component uses the component activation notification method 128 to notify the component manager 101 of the activation. Step 1004 is followed by step 1006, in which the component manager 101 uses the lose activation notification method 158 to notify the previously-active component that it has lost the focus. Step 1006 is followed by the "return" step, which returns to step 904 shown on FIG. 9.

Referring again to step 1002, if the received message did not activate the receiving component, the "no" branch is followed to step 1008, in which the receiving component determines whether the received message changed a program state that the component manager 101 is monitoring.

If the received message changed a program state that the component manager 101 is monitoring, the "yes" branch is followed to step 1010, in which the window procedure for the receiving component, or some other process, uses the component enter state notification method 132 or the component exit state notification method 134 to notify the component manager 101 of the state change. Step 1010 is followed by step 1012, in which the component manager 101 uses the enter state notification method 154 to notify those components that have subscribed to state change notification (i.e. have their state change notification flag 116 set) of the state change. Step 1012 is followed by the "return" step, which returns to step 904 shown on FIG. 9.

Referring again to step 1008, if the received message did not change a program state that the component manager 101 is monitoring, the "no" branch is followed to step 1014, in which the receiving component determines whether the received message changed the tracking component. If the received message changed the tracking component, the "yes" branch is followed to step 1016, in which the window procedure for the tracking component, or some other process, uses the component track method 130 to notify the component manager 101 of the tracking change. Step 1016 is followed by the "return" step, which returns to step 904 shown on FIG. 9.

Figure 11:
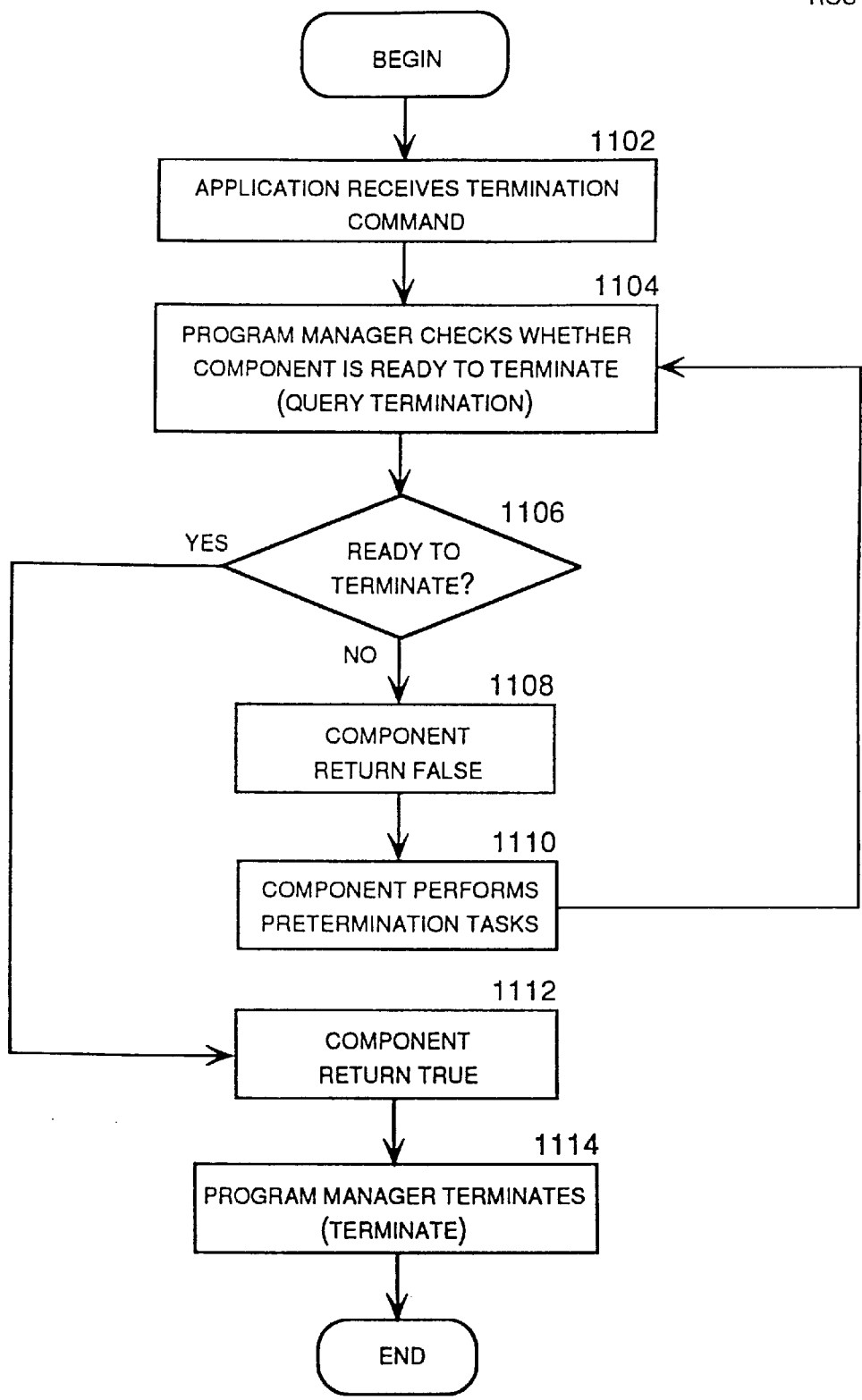
FIG. 11 is a logic flow diagram illustrating a termination routine for the component integration system of FIG. 2.

FIG. 11 is a logic flow diagram illustrating routine 1100 for terminating a component. In step 1102, the application program 36 receives a termination message, such as command to quit the application or shut down the computer system 20. In step 1104, the component manager 101 uses the query termination method 164 to determine whether the component 104 is ready to terminate. Step 1104 is followed by step 1106, in which the component 104 determines whether it is ready to terminate. If the component 104 is not ready to terminate, the "no" branch is followed to step 1110, in which the component 104 returns "false." Step 1104 is followed by step 1108, in which the component 104 performs any pretermination functions are required to terminate, such as ending a modal state or asking the user whether it should finish a background idle time task before termination. From step 1110, routine 1100 loops to step 1104, in which the component manager 101 again uses the query termination method 164 to determine whether the component 104 is ready to terminate.

Referring again to step 1106, once the component 104 is ready to terminate, the "yes" branch is followed to step 1212, in which the component returns "true." Step 1112 is followed by step 1114, in which the component manager 101 uses the terminate method 166 to terminate the execution of the component 104. Step 1114 is followed by the "end" step. Once all of the components have been terminated in an orderly manner as shown in FIG. 11, the application program 36 quits, and the computer system 20 may shut down gracefully.

In view of the foregoing, it will be appreciated that the present invention provides a component integration system including a component manager that controls the main message loop of an application program. The component manager allows a multiplicity of components to share in services provided by the main message loop. It should be understood that the foregoing relates only to the exemplary embodiments of the present invention, and that numerous changes may be made therein without departing from the spirit and scope of the invention as defined by the following claims.

What is claimed is:

1. A computer-readable medium having computer-executable modules comprising:

an application program including a plurality of components and a message queue, the message queue configured for receiving and storing input messages, each component configured for executing a procedure in response to received input messages; and a component manager configured for controlling a message loop of the application program for retrieving input messages from the message queue and dispatching the input messages to the components for further processing, the component manager further configured for, receiving activation messages from the components, in response to the activation messages, maintaining a dynamic active component pointer indicating an active component, maintaining a dynamic registration list for the components, the dynamic registration list including an idle time flag for each component that has idle time tasks to perform, and allocating the idle time to the components that have registered with the component manager and set their respective idle time flags.

2. The computer-readable medium of claim 1, wherein:

the components are running within a single thread or process;

the component manager is further configured for dispatching the input messages to the active component.

3. The computer-readable medium of claim 2, wherein the component manager is further configured for:

dispatching a particular input message to the active component;

before the first component has finished processing the particular input message, receiving a push message loop message; and in response to the push message loop message, continuing message loop processing.

4. The computer-readable medium of claim 3, wherein the component manager receives the push message loop message from a module of the application program.

5. The computer-readable medium of claim 4, wherein the module is the active component.

6. The computer-readable medium of claim 1, wherein the component manager is further configured for:

determining whether a particular input message is an accelerator message; and if the particular input message is an accelerator message, calling an accelerator function of the application program.

7. The computer-readable medium of claim 6, wherein the component manager is further configured for:

maintaining a dynamic registration list for the components, the dynamic registration list including a pretranslate message flag for each component that has pretranslation tasks to perform; and if the active component has its pretranslate message flag set, passing the particular input message to the active component prior to the step of determining whether the particular input message is an accelerator message.

8. The computer-readable medium of claim 1, wherein the component manager is further configured for:

dispatching the input messages to the active tracking component;

receiving tracking messages from the components;

in response to the tracking messages, maintaining a dynamic tracking component pointer;

receiving a begin tracking message indicating a tracking component;

in response to the begin tracking message, suspending the dispatching of the input messages to the active component and initiating the dispatching the input messages to the tracking component;

receiving an end tracking message; and in response to the end tracking message, ending the dispatching of the input messages to the tracking component and resuming the dispatching the input messages to the active component.

9. The computer-readable medium of claim 1, wherein the component manager is further configured for:

maintaining a dynamic registration list for the components, the dynamic registration list including a state change notification flag for each component that wants notification of program state changes of the application program; and receiving a state change message indicating a change in the state of the application program; and in response to the state change message, sending a notification of program state change message to each component in the registration list that has its respective state change notification flag set.

10. The computer-readable medium of claim 9, wherein the component manager receives the state change message from a module of the application program.

11. The computer-readable medium of claim 10, wherein the module is the active component.

12. The computer-readable medium of claim 1, wherein the component manager is further configured for:

maintaining a dynamic registration list for the components, the dynamic registration list including, an idle time flag for each component that has idle time tasks to perform, a pretranslate message flag for each component that has pretranslation tasks to perform, and a state change notification flag for each component that wants notification of program state changes of the application program;

receiving an update registration message from a particular component; and in response to the update registration message, changing the status of the idle time flag, the pretranslate message flag, or the state change notification flag for the particular component.

13. The computer-readable medium of claim 1, wherein the component manager is further configured for:

transmitting a termination query message to a particular component;

in response to the termination query message, receiving a negative termination response message from the particular component;

in response to the negative termination response message, waiting a predetermined period of time and then transmitting a second termination query message to the particular component;

in response to the second termination query message, receiving a positive termination response message from the particular component; and in response to the positive termination response message, transmitting a terminate message to the particular component.

14. A computer-controlled apparatus comprising the computer-readable medium of claim 1.

* * * * *